United States Patent [19]

Riley et al.

[11] Patent Number: 5,138,881
[45] Date of Patent: Aug. 18, 1992

[54] LIQUID LEVEL SENSOR INCLUDING CONDUCTIVE PLASTIC TECHNOLOGY

[75] Inventors: Richard E. Riley, Riverside; Thomas H. Brunjes, Glendora, both of Calif.

[73] Assignee: Spectrol Electronics Corp., Ontario, Calif.

[21] Appl. No.: 654,946

[22] Filed: Feb. 13, 1991

[51] Int. Cl.⁵ .............................................. G01F 23/60
[52] U.S. Cl. .................................... 73/304 R; 338/33; 338/177
[58] Field of Search ...................... 73/304 R, 313, 319, 73/322.5; 200/84 R; 338/33, 176, 177, 216; 340/624

[56] References Cited

U.S. PATENT DOCUMENTS

| | | | |
|---|---|---|---|
| 2,182,195 | 12/1931 | Bornstein | 73/304 R |
| 2,484,690 | 10/1949 | De Giers | |
| 3,106,693 | 10/1963 | De Giers | |
| 3,113,282 | 12/1963 | Coleman | |
| 3,735,638 | 5/1973 | Miller | 73/304 R X |
| 4,052,901 | 10/1977 | Bjork | |
| 4,107,997 | 8/1978 | Snaper | 73/304 R |
| 4,345,235 | 8/1982 | Riley et al. | 338/176 |
| 4,454,761 | 6/1984 | Coulange | |
| 4,567,762 | 2/1986 | Hoppert et al. | |
| 4,637,254 | 1/1987 | Dyben et al. | |
| 4,679,432 | 7/1987 | Draeger | |
| 4,702,107 | 10/1987 | Guerrini et al. | |
| 4,775,435 | 10/1988 | Draeger | |
| 4,779,460 | 10/1988 | Cruickshank | |
| 4,780,663 | 10/1988 | Mulder | 73/304 R X |
| 4,813,282 | 3/1989 | Maggia | 73/313 X |
| 4,827,769 | 5/1989 | Riley et al. | |
| 4,833,919 | 5/1989 | Saito et al. | 73/313 |
| 4,920,798 | 5/1990 | Weaver | |

FOREIGN PATENT DOCUMENTS 2758379 11/1978 Fed. Rep. of Germany .
619958 5/1961 Italy .

Primary Examiner—William A. Cuchlinski, Jr.
Assistant Examiner—G. Bradley Bennett
Attorney, Agent, or Firm—Woodard, Emhardt, Naughton, Moriarty & McNett

[57] ABSTRACT

A liquid level sensor for sensing liquid levels within a container is disclosed. The sensor includes a conductive plastic resistor and conductive plastic conductors deposited onto a thin polymer insulator. The conductive plastic resistor is a potentiometric resistive track which is electrically contacted at points along the length of the resistor by a contact assembly attached to a float. The polymer insulator is attached to a conductive support member or conductive strip disposed substantially vertically in the liquid. The float is disposed about the conductive strip. The contacts provide a short circuit between the resistive strip and conductive strip and thereby provide a resistive circuit connection analogous to the wiper of a potentiometer.

18 Claims, 2 Drawing Sheets

LIQUID LEVEL SENSOR INCLUDING CONDUCTIVE PLASTIC TECHNOLOGY

FIELD OF THE INVENTION

This invention relates in general to liquid level sensors and more specifically to liquid level sensors for use in fuel tank applications.

BACKGROUND OF THE INVENTION

The most commonly used fluid level sensor is the variable resistor sensor utilizing a float to produce a resistance change in the variable resistor. As the float moves vertically with the fluid level, the electrical resistance of the sensor changes typically from 30 to 270 ohms. In most sensors, a sliding or moving contact attached to the float establishes a resistive circuit based upon the position of the contact with respect to a wire-wound resistor or a thick film resistor printed on an insulating base or substrate.

Other approaches to fluid level detection include use of resistors with large temperature coefficients, known as thermistors, located at various vertical positions in the fluid reservoir. As electrical power is applied to the resistors, the devices immersed in the fluid remain cool while those that are exposed to air will increase in temperature and produce a change in overall resistance of the device. Extensive signal conditioning and temperature compensation circuitry is typically required with such a sensor to create a usable signal. Fluid compatibility and manufacturing costs limit widespread acceptance of this type of device.

A vertical sensor with a sliding contact has been used in some automotive applications. Typically a float provides a contact point with respect to a resistor. The resistor is usually a wire helix wound about an insulating mandrel.

Examples of prior art fluid level sensors are shown in the following patents: U.S. Pat. No. 4,827,769 to Riley et al., U.S. Pat. No. 4,779,460 to Cruickshank, U.S. Pat. No. 4,775,435 to Draeger, U.S. Pat. No. 4,702,107 to Guerrini et al., U.S. Pat. No. 4,637,254 to Dyben et al., U.S. Pat. No. 4,567,762 to Hoppert et al., U.S. Pat. No. 4,454,761 to Coulange, U.S. Pat. No. 4,052,901 to Bjork, U.S. Pat. No. 3,113,282 to Coleman, U.S. Pat. No. 3,106,693 to de Giers, U.S. Pat. No. 2,484,690 to de Giers, German Patent No. 2,758,379 and Italian Patent No. 619,958 to Carlo Ceresa et al.

An example of thick film resistor technology used in a liquid level sensor is shown in Weaver, U.S. Pat. No. 4,920,798. The Weaver device includes a thick film resistive coated plate with a slidable contact member providing a resistive signal in accordance with the position of the float.

A low cost liquid level sensor for use in fuel tank applications which is easily configured to the contours of the tank is needed. Further, a liquid level sensor for use in applications wherein the depth detection range of the sensor exceeds 50 centimeters is also needed.

SUMMARY OF THE INVENTION

A liquid level sensor according to one aspect of the present invention comprises an elongated conductive member having at least one elongated planar surface, an insulating film attached to and substantially covering the planar surface of the conductive member, a resistive strip having a first and a second end, the resistive strip attached to the insulating film, the resistive strip substantially aligned with the longitudinal axis of the conductive member, a first conductive strip attached to the insulator, the conductive strip disposed substantially in parallel with the resistive strip, the conductive strip having a length substantially equal to the length of the resistive strip, the first conductive strip electrically connected to the first end of the resistive strip, a second conductive strip attached to the insulator and electrically connected to the second end of the resistive strip, a float having a hole for axially receiving the conductive member wherein the float is positioned according to the liquid level in the container, and electrical contact means attached to the float for continuously establishing an electrical connection between the resistive strip and the conductive member.

One object of the present invention is to provide an improved liquid level sensor.

Another object of the present invention is to provide a more economical liquid level sensor.

A further object of the present invention is to provide a liquid level sensor for use in larger containers.

Yet another object of the present invention is to provide a liquid level sensor which is configurable to the contours of the fuel tank or container in which the sensor is installed.

These and other objects of the present invention will become more apparent from the following description of the preferred embodiment.

DESCRIPTION OF THE PREFERRED EMBODIMENT

Figure 1:
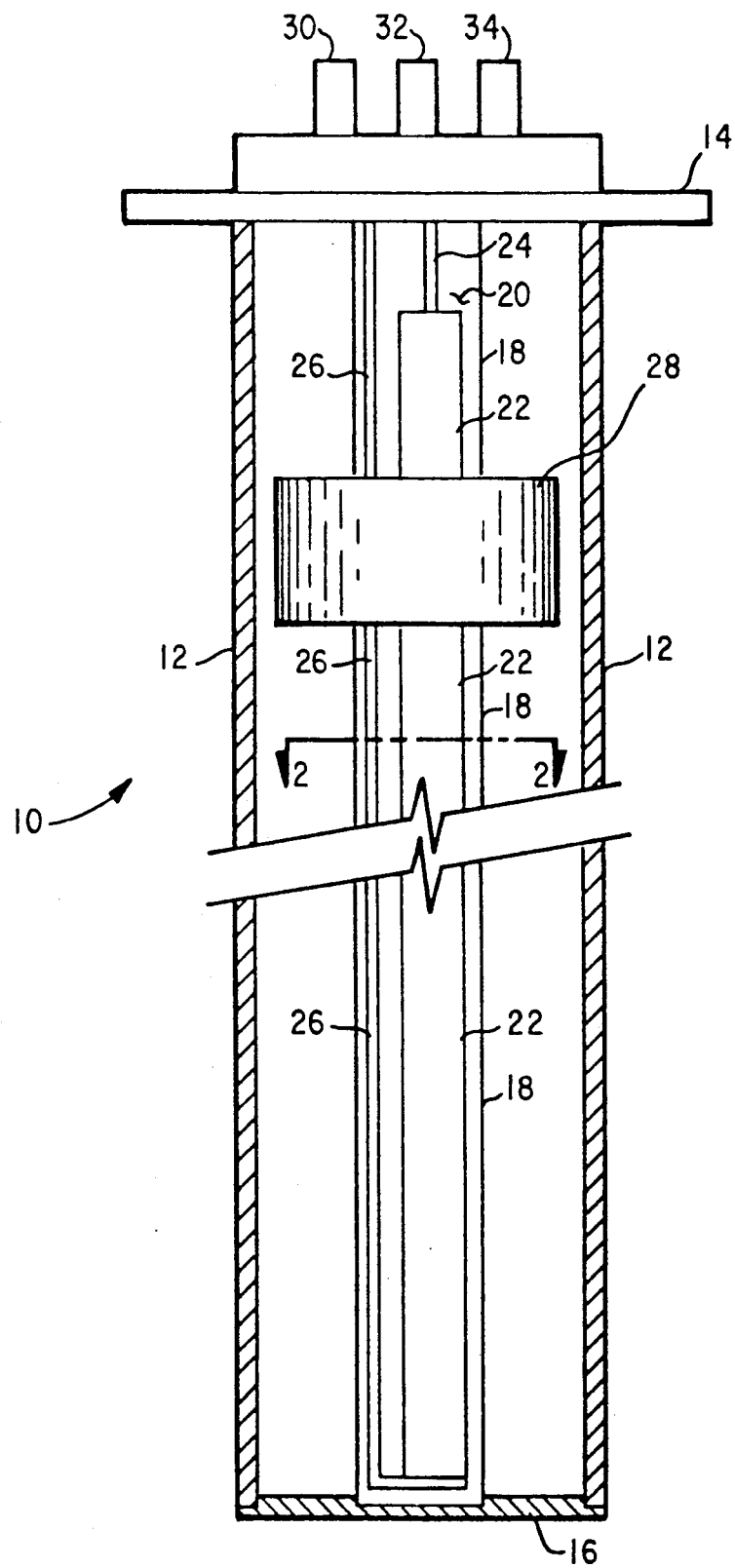
FIG. 1 is a segmented front elevational cross-sectional view of the liquid level sensor according to the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to FIG. 1, a liquid level sensor 10 according to the present invention is shown. The components of sensor 10 are contained within cylindrical housing 12. Top mounting flange 14 and bottom flange 16 secure the conductive strip 18 in position. Flanges 14 and 16 include several holes (not shown) in each flange which allow fluid to freely enter and leave the interior space defined by the walls of housing 12. Flanges 14 and 16 include slots for receiving strip 18 and fixedly retaining strip 18 in position within housing 12. Strip 18 may also be attached to flanges 14 and 16 using adhesives or mechanical mounting fasteners. Strip 18 need not be rectangular in cross-section. Configurations such as a cylindrical rod or a bar with multiple surfaces are also contemplated.

Although the housing and flanges are not necessary for the sensor to operate properly, the housing prevents sloshing about of the fluid which will cause erratic fluid level indications. The primary components of the sensor necessary for providing a resistance or voltage corresponding to fluid level in the container are comprised of conductive strip 18 which includes an electrically insulating polymer film 20 attached to a surface of the strip 18. The insulator or polymer film 20 may be attached using adhesive or other mechanical attachment means such as clips (not shown). Deposited onto the surface of the polymer film 20 is a resistive strip 22 and two conductive strips 24 and 26. The rear surface of conductive strip 18 (shown in FIG. 2) is exposed and uninsulated. Float 28 is positioned vertically along strip 18 in accordance with the fluid level in the container. Terminals 30, 32 and 34 provide a convenient electrical connection to a fluid level gauge or meter (not shown) or to other electronic instrumentation used to monitor the potentiometric response generated by the change in position of float 28.

The sensor 10 of FIG. 1 is typically referred to as a three wire sensor by those skilled in the art. Terminals 30, 32 and 34 are provided to enable convenient electrical connection to the sensor 10. Terminal 30 is electrically connected to strip 18. Terminal 32 is electrically connected to conductive strip 26. Terminal 34 is electrically connected to conductive strip 24. As float 28 moves vertically with respect to the resistive strip 22, the contacts within float 28 provide a short circuit between a corresponding location on resistive strip 22 and the conductive strip 18. A fixed voltage reference signal applied to terminals 32 and 34 produces a voltage at terminal 30 indicative of the relative vertical position of the float versus the resistive strip 22. Terminal 30 thus corresponds with the wiper terminal of a typical potentiometer.

The polymer film 20 is a polyimide polymer available from E.I. duPont de Nemours, and commonly referred to as KAPTON polymer film. The conductive strips 24 and 26 and the resistive strip 22 are conductive plastic films deposited on the KAPTON polymer film insulator via silk-screen printing techniques, sputtering, electrochemical etching or other well-known plastic deposition techniques. The conductive plastic conductor and conductive plastic resistor are made from silver or copper particles suspended in a plastic polymer. Materials used for conductive strips 24 and 26 as well as resistive strip 22 are avilable from Minico/Asahi Chemical of America, a thick film materials supplier, located at 50 North Harrison Avenue, Congers, N.Y. 10920.

Figure 2:
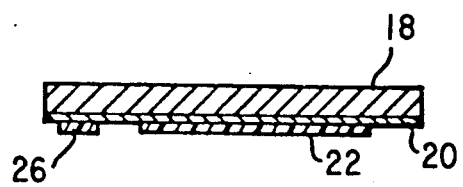
FIG. 2 is an enlarged cross-section of the sensor of FIG. 1 looking in the direction of the arrows labeled 2.

Referring now to FIG. 2, a cross-sectional view looking in the direction of the arrows labeled 2 in FIG. 1 is shown. The cross-sectional view depicts the rectangular geometry of the conductive strip 18 with the insulating polymer film 20 attached to one surface. The conductive strip 26 and resistive strip 22 are shown with enlarged profiles in order to emphasize their physical relationship and normally are relatively thin layers deposited onto the film 20.

Figure 3:
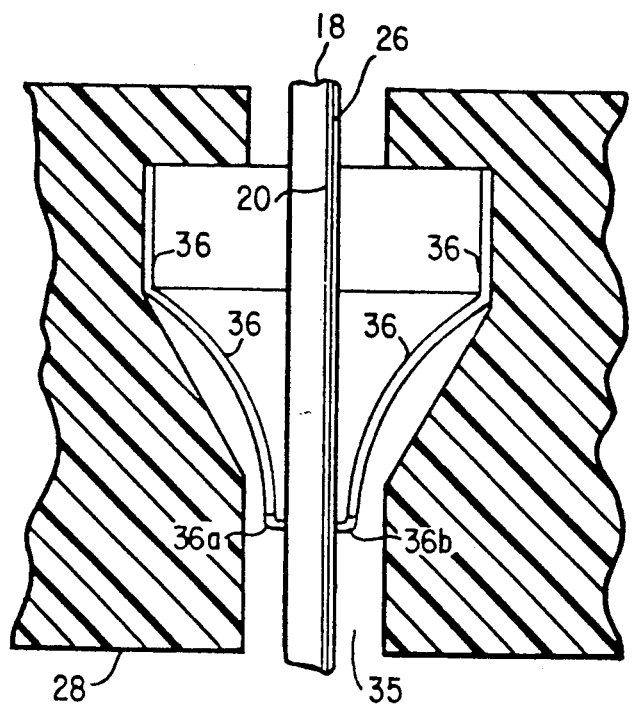
FIG. 3 is an enlarged partial cross-sectional side view of the float in FIG. 1 depicting the contacts attached to the float.

Referring now to FIG. 3, a partial cross-sectional view of the internal structure of float 28 is shown. Strip 18 is inserted and disposed within hole 35. Contact tips 36a and 36b are electrically common and spring biased toward strip 18. The double-sided contact 36 includes multi-finger construction which enables multiple contact points with the resistive strip 22 and the conductive strip 18. Typically, the contact tips are made from a precious metal alloy to provide long life, low frictional force, low electrical noise, corrosion resistance, and a constant cross-sectional area over the life of the sensor. Maintaining a constant cross-sectional area prevents increasing electrical noise due to lower contact force per unit area as the contact wears. The contact 36 is mechanically attached to the internal area of the float 28 to prevent damage during handling. Conductive strip 18 and insulating polymer film 20 are also depicted in FIG. 3. Contact 36 provide a short circuit electrical connection between the resistive strip 22 on the surface of insulator 20 and the strip 18.

A preferred precious metal alloy used in the construction of contact tips 36a and 36b is palladium and silver or solid silver contacts. Typically the contact tips 36a and 36b are precious metal and the remaining portion of the contact 36 is beryllium copper. Beryllium copper, as is well-known in the art, is a resilient spring-like material which is often used in leaf spring applications. Other precious metal alloys such as silver/nickel and silver/cadmium alloys are also contemplated as materials which may be used for fabricating contact tips 36a and 36b. The precious metal contact tips are joined to the beryllium copper leaf spring by rivets, crimping, silver soldering or other well-known attachment techniques.

The liquid level sensor 10 is typically used in a diesel fuel tank application. One of the advantages of incorporating conductive plastic resistor technology in a liquid level sensor is that longer sensor lengths are easily constructed. Sensors up to 64 centimeters in vertical length and longer have been constructed. Laser trimming techniques are contemplated for configuring the resistance of resistive strip 22 to the contours of a fuel tank which requires a non-linear resistance versus vertical displacement of the float. Such is the case with a tank that is not rectangular in cross-sectional contour. Thus, the sensor 10 may be configured to provide an accurate level indication via potentiometer action in any number of fuel tank configurations.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A liquid level sensor for providing a variable resistance corresponding to fluid level in a container, said sensor comprising:

an elongated conductive support member having at least one elongated planar surface;

an insulating film attached to and substantially covering said planar surface of said conductive member;

a resistive strip having a first and a second end, said resistive strip attached to said insulating film, said resistive strip substantially aligned with the longitudinal axis of said conductive member;

a first conductive strip attached to said insulator, said conductive strip disposed substantially in parallel with said resistive strip, said conductive strip having a length substantially equal to the length of said resistive strip, said first conductive strip electrically connected to said first end of said resistive strip;

a second conductive strip attached to said insulator and electrically connected to said second end of said resistive strip;

a float having a hole for axially receiving said conductive member wherein said float is positioned according to the liquid level in the container; and electrical contact means attached to said float for continuously establishing an electrical connection between said resistive strip and said conductive member.

2. The sensor of claim 1 wherein said conductive member is a rectangular strip.

3. The sensor of claim 1 wherein said insulating film is a plastic polymer film.

4. The sensor of claim 3 wherein said resistive strip is a conductive plastic resistor and said first and second conductive strips are conductive plastic conductors.

5. The sensor of claim 4 wherein said float is made of a closed cell foam float.

6. The sensor of claim 5 wherein said conductive member is a rectangular strip.

7. The sensor of claim 6 wherein said resistive strip and said first and second conductive strips are screen printed onto said insulating film.

8. The sensor of claim 7 including a cylindrical housing for receiving said conductive strip and float therein, said sensor further including a top flange and a bottom flange attached to the open ends of said cylindrical housing, said top and bottom flange including means for fixedly receiving said conductive strip when said top and bottom flange are attached to said cylindrical housing, said top and bottom flanges including holes therein which enable fluid to enter and leave the interior of the cylindrical housing.

9. The sensor of claim 8 including a first connection terminal attached to said top flange and electrically connected to said first conductive strip, a second connection terminal attached to said top flange and electrically connected to said second conductive strip, and a third connection terminal attached to said top flange and electrically connected to said conductive member.

10. The sensor of claim 9 wherein said conductive member is aluminum, said insulating film is KAPTON polymer film, and said float is made of nitrile rubber.

11. A liquid level sensor for providing a variable resistance corresponding to fluid level in a container, said sensor comprising:

a conductive rod having a first end and a second end;

an insulating film attached to said conductive rod on the lateral surface of said rod;

a resistive strip having a first and a second end, said resistive strip attached to said insulating film, said resistive strip substantially aligned with the longitudinal axis of said conductive rod;

a first conductive strip attached to said insulator, said conductive strip disposed substantially in parallel with said resistive strip, said conductive strip having a length substantially equal to the length of said resistive strip, said first conductive strip electrically connected to said first end of said resistive strip;

a second conductive strip attached to said insulator and electrically connected to said second end of said resistive strip;

a float having a hole for axially receiving said conductive rod wherein said float is positioned according to the liquid level in the container; and electrical contact means attached to said float for continuously establishing an electrical connection between said resistive strip and said conductive rod.

12. The sensor of claim 11 wherein said rod has a rectangular cross-section.

13. The sensor of claim 12 wherein said resistive strip, said first conductive strip, and said second conductive strip are conductive plastic deposited onto said insulating film.

14. The sensor of claim 13 wherein said conductive plastic is screen-printed onto said insulating film.

15. The sensor of claim 13 wherein said conductive plastic is sputter deposited onto said insulating film.

16. The sensor of claim 13 including a first connection terminal electrically connected to said first conductive strip, a second connection terminal electrically connected to said second conductive strip, and a third connection terminal electrically connected to said conductive rod.

17. The sensor of claim 14 including a cylindrical housing, said conductive rod and said float disposed within said cylindrical housing.

18. The sensor of claim 17 wherein said insulating film is KAPTON polymer film.

* * * * *